United States Patent Office 3,328,252
Patented June 27, 1967

3,328,252
PASTEURELLA AND SALMONELLA VACCINES
Emilio C. Mora, Auburn, Ala., assignor to Auburn Research Foundation, Auburn, Ala., a corporation of Alabama
No Drawing. Filed Nov. 12, 1963, Ser. No. 323,047
16 Claims. (Cl. 167—78)

This application is a continuation-in-part of my prior copending application Serial No. 169,959, filed January 30, 1962, now abandoned.

This invention relates to a novel method for improving the antigenic properties of aqueous killed vaccine preparations of Pasteurella and of Salmonella and to the improved vaccine preparations thus obtained.

Members of the bacterial genera Pasteurella and Salmonella are parasitic upon and are frequently pathogenic for animals and man. Generally speaking, the type of disease with which these organisms are associated is either a septicemia or an enteritis. The use of vaccines in prevention and treatment of Pasteurella and Salmonella infections is well-known. It is a primary object of the present invention to provide means for modifying the known and conventional aqueous killed vaccine preparations of Pasteurella and Salmonella, thereby yielding novel and improved vaccines which produce antibody formation more rapidly and more effectively than the previously available vaccines.

In accordance with the instant invention, the antigenic properties of an aqueous killed vaccine of an organism of the group consisting of Pasteurella and Salmonella are improved by mixing the said vaccine with about 10 to 100 percent of its weight of a water-soluble liquid polyethylene glycol, thus producing a vaccine preparation containing approximately 5 to 50 percent by weight of the water soluble liquid polyethylene glycol. The new preparations obtained in this manner are highly effective aqueous vaccines which on intramuscular or subcutaneous injection elicit a rapid immune response to infection by Pasteurella or Salmonella, as the case may be, and afford excellent results both in the prevention and treatment of such infection.

For best results, the vaccine and the glycol are mixed at a temperature in the approximate range 30–48° C. As a matter of convenience, I usually prefer to do the mixing at ordinary room temperature, that is, about 24–26° C. The mixing is exothermic; for instance, when several liters of liquid are involved the temperature of the resulting mixture usually rises about 10–15 centigrade degrees. The mixture thus obtained is stored in the cold, for instance, in a refrigerator at 2–10° C.; and, in order to assure that it has reached a state of equilibrium, I generally prefer to allow the mixture to stand under these conditions for at least a day or two before subjecting it to conventional control tests. The vaccine preparation thus obtained is tested for sterility, potency, and safety, and the concentration of killed Pasteurella or Salmonella organisms, as the case may be, in the suspension is ascertained and then adjusted as desired, for instance by dilution with physiological saline solution.

In a particularly preferred mode of practicing the instant invention, the amount of polyethylene glycol is initially about one-third the weight of the concentrated vaccine to which it is added (or in other words is about 25 percent by weight of the mixture), and is of the order of 6 to 8 percent in the final mixture obtained when the concentration of the vaccine preparation is adjusted to ordinary use levels by dilution with physiological saline solution.

As indicated hereinabove, the aqueous killed vaccines used as starting materials in the practice of my invention are conventional in the vaccine art. They are readily prepared by killing a virulent culture of a species of Pasteurella or Salmonella suspended in an aqueous medium. This is ordinarily accomplished by use of appropriate physical or chemical means, such as by heating or by adding phenols, formaldehyde, or ethylene oxide; or, if desired, both means can be employed. For instance, an aqueous suspension of the selected culture is heat-shocked and then treated with formaldehyde. The heat-shocking step in this method is usually carried out by heating the aqueous suspension to a temperature in the approximate range of 55–60° C. The period during which the suspension is kept at this temperature may be very brief, that is, only a few minutes or even less, when it is desired merely to induce lysis and release of antigens from a small percentage of the cells; or the heating period may be longer, for instance up to an hour or more, when it is desired to heat-kill a substantial proportion of the bacteria. The formaldehyde-treating step is ordinarily carried out by adding sufficient formalin (37 percent aqueous formaldehyde solution) to the suspension to produce a formalin concentration of the order of 0.1–0.5 percent (or approximately 0.04–0.2 percent of formaldehyde). The treatment with formaldehyde serves the purposes of killing bacteria and detoxifying the vaccine.

The instant invention is adapted to the improvement of monovalent, bivalent, or polyvalent aqueous killed vaccines. It will of course be readily appreciated that, generally speaking, the closer the antigenic characteristics of the strain used to prepare a vaccine correspond to the antigenic characteristics of the potentially infective Pasteurella or Salmonella organisms which are encountered after vaccination, the better the vaccine will serve its intended purpose. Accordingly, in order to produce a vaccine preparation having broad protective value, it will ordinarily be preferred to use, instead of a monovalent vaccine, either bivalent or polyvalent aqueous vaccines derived from two or more strains of Pasteurella or Salmonella, for instance strains obtained from isolates from active outbreaks of Pasteurella or Salmonella. The improvement of the bivalent or polyvalent types in accordance with my invention can be carried out by treating the individual monovalent vaccines with the polyethylene glycol and then mixing the thus-treated vaccines; or, alternatively, the untreated monovalent vaccines are mixed at any desired stage of preparation, and the resulting bivalent or polyvalent vaccine is treated with the polyethylene glycol.

The water-soluble liquid polyethylene glycols useful in the practice of my invention are a well-known and readily available class of compounds which are water-soluble polymers formed by condensation of ethylene oxide and having an average molecular weight in the approximate range 200 to 600. I have found that polyethylene glycol having an average molecular weight of 400 affords best results in the instant invention. These compounds are well-tolerated in the animal organism and have very low toxicity. The highly advantageous effect of the polyethylene glycol in improving the antigenic properties of the aqueous killed vaccine is due in part to an increase in the total amount of antigenic substance exposed and thus available to stimulate formation of antibodies when used for vaccination. Moreover, there is produced a solubilization of a significant proportion of the antigens which permits a faster absorption thereof by post-vaccination, so that rapid formation of antibodies takes place. The polyethylene glycol also has a bacteriostatic effect and aids in ensuring that the vaccine remains sterile.

As a result of all of the effects mentioned above, the aqueous killed vaccine preparations of Pasteurella and Salmonella obtained in accordance with my new method not only have a high degree of antigenicity but the antigens therein are readily and rapidly absorbed after injection of the vaccine preparations.

In comparison with the conventional vaccines which have not been treated in accordance with my new method, the new vaccine preparations which are produced by the method of the instant invention have substantially increased antigenicity and are more rapidly absorbed when injected, as measured by the speed of appearance and amount of agglutinating antibodies post-vaccination. Moreover, in sharp contrast with the variable results obtained with the conventional aqueous killed vaccines, the improved vaccine preparations of this invention produce consistent and better results both in treatment of and protection from infection by Pasteurella and Salmonella organisms.

The instant invention is of particular value in the preparation of improved vaccines for administration to fowl for the prevention of and treatment of infections by species of Pasteurella and Salmonella.

My invention is illustrated by the following examples without, however, being limited thereto.

*Example 1*

This example describes the preparation of a vaccine of *Pasteurella multocida* for treatment of fowl cholera.

Fowl cholera, also designated avian pasteurellosis, is a highly contagious disease which affects practically all species of fowls, both domestic and wild, such as chickens, turkeys, ducks, geese, and the like; for instance, see the discussion G. S. Harshfield at pages 273–286 in "Diseases of Poultry," edited by H. E. Biester and L. H. Schwarte, The Iowa State University Press, Ames, Iowa, fourth edition, 1959. Outbreaks of fowl cholera usually start without warning in apparently healthy poultry flocks and sudden deaths in high percentage may occur unless control is effected promptly. After several days the mortality decreases and the disease becomes chronic, the more common symptoms being one or a combination of respiratory signs, coryza, swollen wattles, twisted necks, lameness, and in layers a drop in egg production.

The causative agent of fowl cholera is *Pasteurella multocida*, a gram-negative ovoid or rod shaped bacterium. Strains of this organism have been classified according to several different schemes, for instance on the basis of fermentation reactions, colonial variation, or serological typing. A capsular substance of a mucoid nature is present in recently isolated cultures of *Pasteurella multocida*. This capsule is usually lost if the organism is cultivated on arificial media for prolonged periods. The presence of capsular and somatic antigens has been reported and various theories have been evolved as to the role of these antigenic factors in the mechanism of immune response.

The best control of fowl cholera has been through prevention afforded by good management practices. When outbreaks of the disease occur, chemotherapeutic drugs and intramuscularly and subcutaneously administered vaccines have proved of some value, although the results of such treatment have been variable. The vaccines employed have been obtained by attenuating or killing the bacteria in cultures of one or more strains of *Pasteurella multocida* and then suspending them in either an aqueous or an emulsified oil medium. The emulsified oil vaccines, although effective in stimulating prolonged antibody production in poultry, generally have not given maximum protection until several weeks after injection and hence have been of little value in flocks infected with acute fowl cholera. Althonugh aqueous fowl cholera vaccines stimulate a faster immune response, and have afforded in some instances good protection of fowl against subsequent exposure to fowl cholera under laboratory conditions, they have frequently proved to be unreliable in practical field use, giving contradictory or inconsistent results. It appears likely that at least some of the failures of these aqueous vaccines have been due to the lack of sufficient amounts of the immunity-producing capsular and somatic antigens in an available form.

For the purpose of preparing an improved injectable aqueous killed vaccine of *Pasteurella multocida* capable of reliably producing rapid and effective antibody formation when injected into fowl, thereby affording means for treatment of fowl cholera as well as for producing prophylactic protection against this disease, I proceeded as follows:

Two virulent strains of *Pasteurella multocida*, which I have arbitrarily designated strain C and strain 9 respectively, were isolated from liver and bone marrow specimens of chickens dying as the result of spontaneous outbreaks of fowl cholera at different times in two separate chicken flocks. Single colony subcultures from the original blood agar isolates were made on tryptose blood agar. Using these subcultures, the two strains were identified by cultural morphology and biochemical reactions, stained morphology, and specific agglutinability with immune sera, as follow. Each strain was grown on tryptose blood agar base medium fortified with 5 percent whole bovine blood. With both strains, after 24 hours, incubation at 37° C., colonies appeared which varied in diameter from 0.5 to 1.5 mm. and which tended to become confluent and homogeneous; they were non-hemolytic. Microscopic examination of the bacterial cells of each strain showed small, gram negative coccobacilli measuring 0.1–0.3 micron by 0.3–0.5 micron when stained with Gram's stain. When stained with Wright's blood stain the cells showed a pronounced bipolarity. When all suspensions in physiological saline were inoculated into differential media and sugar broths containing phenol red as an indicator and incubated at 37° C. for forty-eight hours, the following results were obtained: neither strain C nor strain 9 gave a reaction in lactose broth, maltose broth, xylose broth, inositol broth, rhamnose broth, and inulin broth; neither strain liquefied gelatin, produced hydrogen sulfide, or utilized citrate; both strain C and strain 9 produced acid, but no gas, in arabinose broth, sucrose broth, mannitol broth, dextrose broth, and sorbitol broth; in trehalose broth, strain C gave no reaction but strain 9 produced a slight acidic reaction. Using antisera prepared from the respective original isolates, the serological specificity of the subcultures was confirmed by agglutination tests. Before use in vaccine preparation, the virulence of each strain was maintained by weekly or oftener passage through disease-free chickens two to four weeks of age, single cell colony isolations being made from the liver of the chickens after it died from the infection; death usually occurred within 18 to 24 hours after inoculation.

Strain C and strain 9 were used to prepare a bivalent vaccine in the following manner. A 24- to 96-hour old culture of each strain which had been grown in tryptose blood agar base fortified with 5 percent whole bovine blood was removed by means of sterile bacteriological loops and suspended in physiological saline solution. Each of the two suspensions were adjusted to approximately the same optical density, in this instance an optical density of 0.09 at a wavelength of 5250 angstroms. (This approximate equalization of the concentration of the two strains was a matter of convenience since it was intended to mix the respective vaccines after preparation thereof in order to obtain a bivalent vaccine starting material. When the univalent vaccines are to be used as such, then there is no particular advantage in having the concentrations the same.) The two suspensions were then used to inoculate the surface of sterile solid tryptose blood agar base (without blood) contained in sterile Roux culture bottles, a 2.0 ml. portion of the strain C suspension being added to each of 25 bottles in one group and a 2 ml. portion of the strain 9 suspension being added to each of 25 bottles in another group of bottles. During the inoculation and the subsequent harvesting procedure, the bottles were kept on towels saturated with 1:1000 benzalkonium chloride solution as a disinfectant; and the personnel involved wore sterile masks, caps, and uniforms during the vaccine production. After plugging the neck of each inoculated bottle with sterile cotton, the bottle was rotated gently to spread the inoculum evenly over the surface of the agar medium and was then placed in an incubator at 37° C. for approximately 24 hours. The bottles were then removed and were examined for homogeneity and confluence of bacterial growth and for possible contamination. Both strains C and 9 grew characteristically in a semi-confluent pattern and were non-chromogenic, dull white in color, and emitted a bluish fluorescence when viewed directly under a light source, the strain 9 growth being slightly granular in appearance. The growths in all of the bottles were found to be free of contamination. (Any contaminated bottles should be of course be discarded.) The necks and lips of each bottle were disinfected by wiping with a solution of 1:1000 benzalkonium chloride solution and, using aseptic conditions, the growth in each bottle was loosened with a rod and suspended in 10 ml. of sterile physiological saline solution. Each bottle was washed with a second 10 ml. portion of saline which was then added to the 10 ml. suspension first obtained. The respective suspensions of each strain were first pooled, and then the two pooled collections thus obtained were mixed in a sterile flask and warmed slowly, with agitation, on a water bath until the temperature of the suspension reached 58° C. The flask and suspension therein were then removed from the water bath and allowed to cool to 40° C. The volume of the suspension was measured and determined to be 900 ml., and sufficient formalin (2.43 ml.) was added to give a formaldehyde concentration of 0.1 percent in the mixture. The flask was gently rotated at frequent intervals for a period of thirty minutes to ensure uniform mixing of the formaldehyde.

To the heat-shocked and formalinized suspension thus prepared there was added at room temperature with constant shaking of the suspension one-third of its volume of a polyethylene glycol having an average molecular weight of 400. This mixing was exothermic, the temperature of the mixture rising to about 45° C. After the mixture had been stored in a refrigerator at 4° C. for 48 hours aliquots were tested for sterility on tryptose blood agar, nutrient agar, desoxycholate agar, SS agar, and corn meal agar. No visible organisms appeared on any of these media.

The concentrated suspension obtained in the above manner was diluted with sterile physiological saline to yield 4000 ml. of bivalent vaccine preparation containing approximately $6 \times 10^9$ killed *Pasteurella multocida* organisms per ml. and thus having approximately $3 \times 10^9$ bacteria per normal dosage volume of 0.5 ml. This was done by adjusting the amount of saline diluent to yield a suspension of optical density $0.725 \pm 0.025$ at 640 m$\mu$, using a Bausch and Lomb Spectronic 20 apparatus. The sterility tests mentioned above were repeated on this vaccine preparation, and potency tests were carried out as follows. In one group of three to five week old chickens, an initial subcutaneous injection of 0.5 ml. of vaccine preparation per bird was followed 15 days post-injection with a second 0.5 ml. subcutaneous dose. A second group of three to five week old chickens was used as a control. Fourteen days after the second injection, each of the birds in both groups was challenged by intramuscular injection with 0.1 ml. of a combination of viable cells homologous of the *Pasteurella multocida* strains C and 9 and of a highly virulent heterologous field strain of *Pasteurella multocida*. As the result of this challenge, in the vaccinated group of birds, 8 out of 10 survived and exhibited no clinical signs of infection and 8 out of 10 of the controls died, indicating the satisfactory potency and protective value of the vaccine preparation.

To test the vaccine preparation for safety, three 3-week old chickens were each injected subcutaneously in the thigh or in the neck area with a 3.0 ml. dose (that is, six times the usual initial dose). The birds were observed for ten days, during which period they remained normal in appearance, and were then sacrificed. The birds were found to be free of gross pathological changes.

After the above tests had demonstrated that the vaccine preparation was sterile, potent, and safe, 1 ml. of formalin was added to each 4000 ml. of vaccine preparation to serve as a preservative. The vaccine preparation was then bottled under aseptic conditions and stored under refrigeration at 3–12° C. until it was administered to fowl. Under these experimental conditions, it was determined that the vaccine preparation was still satisfactory two years after preparation.

*Example 2*

Proceeding in the manner described in Example 1 above, there was prepared a heat-shocked, formalinized, polyethylene glycol-treated trivalent vaccine containing three virulent strains of *Pasteurella multocida* identified as follows: strain C and strain 9, each obtained as described above in Example 1, and strain Gulsby, obtained from the Alabama State Diagnostic Laboratory, Auburn, Ala. After determining that this trivalent vaccine preparation was sterile, safe, and potent, it was tested in field trials in nine flocks of chickens totalling 67,000 birds. All of the flocks had active outbreaks of fowl cholera and in all cases the birds were being medicated chemotherapeutically with little or no success. The birds were inoculated with the vaccine preparation twice within a three week interval with standardized 0.5 ml. doses. The results obtained in all cases were: (1) drop in mortality within eight days; (2) no increase in mortality after removal of medication, usually after 4–5 days; (3) no birds developed chronic symptoms during a period up to eight months after vaccination; (4) one flock of 1,600 healthy pullets was vaccinated three weeks prior to being moved into pens which had previously housed layers infected with fowl cholera and no birds showed symptoms of fowl cholera during a two month interval immediately following vaccination and there was no drop in egg production immediately after vaccination.

*Example 3*

The polyethylene glycol-treated bivalent vaccine obtained as described above in Example 1 (designated Vaccine I) and a bivalent vaccine obtained in the same manner with the exception that it was not treated with polyethylene glycol (designated Vaccine II) were compared as to amount and rapidity of appearance of antibodies produced when each was injected subcutaneously into 3-week old White Rock Cross chickens, mixed sexes. In each instance there was used for the vaccination a 0.5 ml. dose of vaccine containing approximately $3 \times 10^9$ cells of *Pasteurella multocida*. The antibody titers were determined at twenty-four hour intervals post-vaccination. Blood samples (0.5 ml. each) were taken from the birds by cardiac puncture or from the wing vein and placed in tubes which were heated in a water bath at 44° C. for six hours. The tubes were then centrifuged and the sera were collected. These samples were tested by the rapid slide agglutination test, using as antigen a saline suspension of dead twenty-four hour old cells ($8 \times 10^9$ cells per ml.) from blood agar of *Pasteurella multocida* strains 9 and C. On the test slides were placed 0.3 ml. of the test sample and 0.3 ml. of cell suspension, and on the control slides were placed 0.3 ml. of physiological saline and 0.3 ml. of cell suspension. The reagents on each slide were mixed well with an applicator stick, and the slide was placed on a hot plate at 45° C. for one minute. The slide was then removed and the reagents thereon were mixed again by rotation of the slide for two minutes. The slides were then observed under a microscope. A reaction was considered positive only if at least approximately 50 percent of the cells were agglutinated. The sera were serially diluted with physiological saline solution, so as to determine the highest serum dilution at which at least 50 percent of the antigen cells were agglutinated. The results which were obtained in these tests are shown below in Table I. All tests at twenty-four, forty-eight, and seventy-two hours post-inoculation were negative (Neg.).

TABLE I

| Bird No. | Vaccine | Antibody Titer Post-Inoculation | | | | | |
|---|---|---|---|---|---|---|---|
| | | 96 hrs. | 120 hrs. | 144 hrs. | 168 hrs. | 192 hrs. | 216 hrs. |
| 1 | I | 1:2 | 1:10 | 1:10 | 1:25 | 1:80 | 1:80 |
| 2 | I | 1:5 | 1:10 | 1:25 | 1:100 | 1:160 | 1:160 |
| 3 | I | 1:5 | 1:40 | 1:80 | 1:120 | 1:160 | 1:160 |
| 4 | I | 1:10 | 1:40 | 1:80 | 1:180 | 1:120 | 1:320 |
| 5 | I | 1:4 | 1:25 | 1:50 | 1:80 | 1:80 | 1:120 |
| 6 | I | Neg. | 1:5 | 1:40 | 1:40 | 1:80 | 1:100 |
| 7 | II | Neg. | Neg. | Neg. | Neg. | 1:5 | 1:20 |
| 8 | II | Neg. | Neg. | 1:2 | 1:2 | 1:10 | 1:20 |
| 9 | II | Neg. | Neg. | Neg. | 1:10 | 1:10 | 1:60 |
| 10 | II | Neg. | Neg. | Neg. | 1:10 | 1:20 | 1:80 |
| 11 | II | Neg. | Neg. | Neg. | 1:5 | 1:10 | 1:40 |
| 12 | II | Neg. | 1:2 | 1:2 | 1:10 | 1:40 | 1:60 |

The results set forth above show clearly the substantial advantages of the polyethylene glycol-treated vaccine (I) of the instant invention over the untreated vaccine (II) in antibody production as to both amount and rapidity of appearance of antibody.

*Example 4*

Two virulent strains of Salmonella spp. were isolated from the livers and spleens of chickens submitted for examination. The chickens were representative specimens from two widely separated poultry farms. The disease was diagnosed as fowl typhoid on the basis of gross pathology, and cultures of the two strains were identified as Salmonella gallinarum. The two isolates were arbitrarily designated strain D and strain P. Single colony subcultures from the original blood agar plate isolates were made on desoxycholate agar. Using bacterial suspensions in physiological saline from these subcultures, the two isolates were identified as Salmonella on the basis of biochemical reactions, staining morphology and specific agglutinability with polyvalent Salmonella antiserum and with Salmonella Group D specific antiserum, as follows. Each strain was grown on desoxycholate agar medium. With both strains, after 24 hours incubation at 37° C., colonies appeared which were colorless, smooth and raised and which varied from 0.7 to 1.6 mm. in diameter. Microscopic examination of the bacterial cells of each strain showed gram negative bacilli measuring 0.3–0.5 micron by 0.4–2.4 microns when stained with Gram's stain. Suspensions of bacteria from both strains were made in physiological saline and aliquots of each suspensions were used as inocula for differential sugar broths containing phenol red as indicator and incubated at 37° C. for forty-eight hours. The following results were obtained: neither strain produced acid in salicin, sorbitol, sacchrose, inositol, inulin or lactose; maltose, rhamnose, arabinose, mannitol, dextrose and galactose were fermented with acid and gas by strain D but strain P produced only acid; both strains produced a slight acidity but no gas in dulcitol, trehalose and xylose; both strains produced hydrogen sulfide; and both strains were non-motile. Using antisera prepared from the respective original isolates, the serological specificity of the subcultures was confirmed by agglutination tests.

Specific agglutinability with polyvalent Salmonella antiserum and with Salmonella Group D specific antisera were conducted as follows. (*S. gallinarum* is in Salmonella serological Group D.) A dense bacterial suspension of the organisms to be tested was made by emulsifying bacteria from desoxycholate agar in 0.85 percent sodium chloride solution. A drop (0.05 ml.) of Salmonella O antiserum polyvalent was mixed on a clean slide with 0.05 ml. of the bacterial suspension. The slide was placed on a warm 45° C. surface and the slide was rotated in a circular motion for 2 minutes. Rapid and complete agglutination was considered a positive test. A negative control test consisting of 0.05 ml. of 0.85 percent sodium chloride solution and 0.05 ml. of the bacterial suspension was conducted simultaneously. The above procedure was repeated using Salmonella O antiserum group D. Both strains D and P produced positive tests with polyvalent O and group D specific antisera.

Before use in vaccine preparation, the virulence of each strain was maintained by weekly passage through disease-free chickens two to four weeks of age, single cell colony isolations being made from the liver of the chicken after it died from the infection; death usually occurred within 48 to 96 hours after inoculation.

Strain D and strain P were used to prepare a bivalent vaccine in the following manner. A 24- to 96-hour old culture of each strain which had been grown in desoxycholate agar was removed by means of sterile bacteriological loops and suspended in physiological saline solution. Each of the two suspensions were adjusted to approximately the same optical density, in this instance an optical density of 0.09 at a wave length of 5250 angstroms. (This aproximate equalization of the concentration of the two strains was a matter of convenience since it was intended to mix the respective vaccines after preparation thereof in order to obtain a bivalent vaccine starting material. When the univalent vaccines are to be used as such, then there is no particular advantage in having the concentrations the same.) The two suspensions were then used to inoculate the surface of sterile solid tryptose blood agar base (without blood) contained in sterile Roux culture bottles, a 2.0 ml. portion of the strain D suspension being added to each of 25 bottles in one group and a 2 ml. portion of the strain P suspension being added to each of 25 bottles in another group of bottles. During the inoculation and the subsequent harvesting procedure, the bottles were kept on towels saturated with 1:1000 benzalkonium chloride solution as a disinfectant; and the personnel involved wore sterile masks, caps, and uniforms during the vaccine production. After plugging the neck of each inoculated bottle with sterile cotton, the bottle was rotated gently to spread the inoculum evenly over the surface of the agar medium and was then placed in an incubator at 37° C. for approximately 24 hours. The bottles were then removed and were examined for homogeneity and confluence of bacterial growth and for possible contamination. Both strains D and P grew characteristically in a semi-confluent pattern and were non-chromogenic, dull white in color. The growths in all of the bottles were found to be free of contamination. (Any contaminated bottles should of course be discarded.) The necks and lips of each bottle were disinfected by wiping with a solution of 1:1000 benzalkonium chloride solution and, using aseptic conditions, the growth in each bottle was loosened with a rod and suspended in 10 ml. of sterile physiological saline solution. Each bottle was washed with a second 10 ml. portion of saline which was then added to the 10 ml. suspension first obtained. The respective suspensions of each strain were first pooled, and then the two pooled collections thus obtained were mixed in a sterile flask and warmed slowly, with agitation, on a water bath until the temperature of the suspension reached 62° C. and maintained at this temperature for 45 minutes. The flask and suspension therein were then removed from the water bath and allowed to cool to 40° C. The volume of the suspension was measured and determined to be 900 ml., and sufficient Formalin (2.43 ml.) was added to give a formaldehyde concentration of 0.1 percent in the mixture. The flask was gently rotated at frequent intervals for a period of thirty minutes to ensure uniform mixing of the formaldehyde.

To the heat-shocked and formalinized suspension thus prepared there was added at room temperature with constant shaking of the suspension one-third of its volume of a polyethylene glycol having an average molecular weight of 400. This mixing was exothermic, the temperature of the mixture rising to about 45° C. After the mixture had been stored in a refrigerator at 4° C. for 48 hours aliquots were tested for sterility on tryptose blood agar, nutrient agar, desoxycholate agar, SS agar, and corn meal agar. No viable organisms appeared on any of these media.

The concentrated suspension obtained in the above manner was diluted with sterile physiological saline to yield 4000 ml. of bivalent vaccine preparation containing approximately $6 \times 10^9$ killed Salmonella gallinarum organisms per ml. and thus having approximately $3 \times 10^9$ bacteria per normal dosage volume of 0.5 ml. This was done by adjusting the amount of saline diluent to yield a suspension of optical density $0.725 \pm 0.025$ at 640 mµ, using a Bausch and Lomb Spectronic 20 apparatus. The sterility tests mentioned above were repeated on this vaccine preparation, and potency tests were carried out as follows. In one group of three to five week old chickens, an initial subcutaneous injection of 0.5 ml. of vaccine preparation per bird was followed 15 days post-injection with a second 0.5 ml. subcutaneous dose. A second group of three to five week old chickens was used as a control. Fourteen days after the second injection, each of the birds in both groups was challenged by intramuscular injection with 0.1 ml. of a combination of viable cells homologous of the Salmonella gallinarum strains D and P and of a highly virulent heterologous field strain of Salmonella gallinarum. As the result of this challenge, in the vaccinated group of birds, 10 out of 10 survived and exhibited no clinical signs of infection and 8 out of 10 of the controls died, indicating the satisfactory potency and protective value of the vaccine preparation.

To test the vaccine preparation for safety, three 3-week old chickens were each injected subcutaneously in the thigh or in the neck area with a 3.0 ml. dose (that is, six times the usual initial dose). The birds were observed for ten days, during which period they remained normal in appearance, and were then sacrificed. The birds were found to be free of gross pathological changes.

After the above tests had demonstrated that the vaccine preparation was sterile, potent, and safe, 1 ml. of formalin was added to each 4000 ml. of vaccine preparation to serve as a preservative. The vaccine preparation was then bottled under aseptic conditions and stored under refrigeration at 3–12° C. until it was administered to fowl. Under these experimental conditions, it was determined that the vaccine preparation was still satisfactory two years after preparation.

*Example 5*

Proceeding in the manner described in Example 4 above, there was prepared a heat-shocked, formalinized, polyethylene glycol-treated bivalent vaccine containing two virulent strains of Salmonella gallinarum identified as follows: strain D and strain P, each obtained as described above in Example 4. After determining that this bivalent vaccine preparation was sterile, safe, and potent, it was tested in field trials in six flocks of chickens totalling 72,000 birds. All of the flocks had active outbreaks of fowl typhoid and in all cases the birds were being medicated chemotherapeutically with little or no success. The birds were inoculated with the vaccine preparation twice within a three week interval with standardized 0.5 ml. doses. The results obtained in all cases were: (1) drop in mortality within eight days; (2) no increase in mortality after removal of medication, usually after 4–5 days; (3) no birds developed chronic symptoms during a period up to one year after vaccination; (4) at two month intervals for eight months, 4 to 5 percent of the vaccinated birds were blood tested with pullorum stained antigen K polyvalent and all birds tested had positive agglutination tests six months after vaccination. Sixty-five percent of the birds tested had positive test eight months after vaccination. The positive tests were indicative of circulating antibodies against *Salmonella gallinarum* (pullorum).

*Example 6*

The polyethylene glycol-treated bivalent vaccine obtained as described above in Example 4 (designated Vaccine III) and a bivalent vaccine obtained in the same manner with the exception that it was not treated with polyethylene glycol (designated Vaccine IV) were compared as to amount and rapidity of appearance of antibodies produced when each was injected subcutaneously into 3-week old White Leghorn Cross chickens, mixed sexes. In each instance there was used for the vaccination a 0.5 ml. dose of vaccine containing approximately $3\times10^9$ cells of *Salmonella gallinarum*. The antibody titers were determined at twenty-four hour intervals post-vaccination. Blood samples (0.5 ml. each) were taken from the birds by cardiac puncture or from the wing vein and placed in tubes which were heated in a water bath at 44° C. for six hours. The tubes were then centrifuged and the sera were collected. These samples were tested by the rapid slide agglutination test, using as antigen a saline suspension of dead twenty-four hour old cells ($8\times10^9$ cells per ml.) from desoxycholate agar of *Salmonella gallinarum* strains D and P. On the test slides were placed 0.05 ml. of the test sample and 0.05 ml. of cell suspension, and on the control slides were placed 0.05 ml. of physiological saline and 0.05 ml. of cell suspension. The reagents on each slide were mixed well with an applicator stick, and the slide was placed on a hot plate at 45° C. for one minute. The slide was then removed and the reagents thereon were mixed again by rotation of the slide for two minutes. The slides were then observed under a microscope. A reaction was considered positive only if at least approximately 50 percent of the cells were agglutinated. The sera were serially diluted with physiological saline solution, so as to determine the highest serum dilution at which at least 50 percent of the nitrogen cells were agglutinated. In Table II below there are shown the results which were obtained in these tests at forty-eight hour intervals. All tests through 4 days post-inoculation were negative (Neg.).

TABLE II

| Bird No. | Vaccine | Antibody Titer Post-Inoculation in Day | | | | | |
|---|---|---|---|---|---|---|---|
| | | 5 | 7 | 9 | 11 | 13 | 15 s |
| 1 | III | 1:10 | 1:80 | 1:160 | 1:320 | 1:640 | 1:1280 |
| | Pullorum Test | − | − | + | + | + | + |
| 2 | III | 1:5 | 1:80 | 1:160 | 1:320 | 1:640 | 1:640 |
| | Pullorum Test | − | − | − | + | + | + |
| 3 | III | − | 1:80 | 1:160 | 1:320 | 1:640 | 1:640 |
| | Pullorum Test | − | − | + | + | + | + |
| 4 | III | 1:4 | 1:160 | 1:320 | 1:640 | 1:1280 | 1:1280 |
| | Pullorum Test | − | − | + | + | + | + |
| 5 | III | − | 1:80 | 1:160 | 1:320 | 1:640 | 1:1280 |
| | Pullorum Test | − | − | + | + | + | + |
| 6 | III | 1:10 | 1:160 | 1:320 | 1:640 | 1:1280 | 1:2560 |
| | Pullorum Test | − | + | + | + | + | + |
| 7 | III | 1:10 | 1:160 | 1:320 | 1:640 | 1:1280 | 1:2560 |
| | Pullorum Test | − | − | + | + | + | + |
| 8 | III | 1:16 | 1:160 | 1:320 | 1:640 | 1:1280 | 1:1280 |
| | Pullorum Test | − | + | + | + | + | + |
| 9 | III | − | 1:80 | 1:160 | 1:160 | 1:320 | 1:640 |
| | Pullorum Test | − | − | − | + | + | + |
| 10 | III | − | 1:40 | 1:80 | 1:160 | 1:320 | 1:640 |
| | Pullorum Test | − | − | + | + | + | + |
| 11 | IV | 1:4 | 1:40 | 1:80 | 1:80 | 1:160 | 1:320 |
| | Pullorum Test | − | − | − | − | + | + |
| 12 | IV | − | 1:40 | 1:80 | 1:160 | 1:640 | 1:640 |
| | Pullorum Test | − | − | − | + | + | + |
| 13 | IV | − | 1:20 | 1:80 | 1:160 | 1:160 | 1:160 |
| | Pullorum Test | − | − | − | + | + | + |
| 14 | IV | − | 1:40 | 1:40 | 1:160 | 1:160 | 1:640 |
| | Pullorum Test | − | − | − | + | + | + |
| 15 | IV | 1:4 | 1:80 | 1:160 | 1:320 | 1:320 | 1:1280 |
| | Pullorum Test | − | − | − | + | + | + |
| 16 | IV | − | 1:40 | 1:80 | 1:160 | 1:320 | 1:640 |
| | Pullorum Test | − | − | − | + | + | + |
| 17 | IV | − | 1:10 | 1:40 | 1:80 | 1:320 | 1:640 |
| | Pullorum Test | − | − | + | + | + | + |
| 18 | IV | − | 1:10 | 1:80 | 1:160 | 1:320 | 1:640 |
| | Pullorum Test | − | − | − | + | + | + |
| 19 | IV | − | 1:40 | 1:160 | 1:320 | 1:640 | 1:1280 |
| | Pullorum Test | − | − | − | + | + | + |
| 20 | IV | − | 1:80 | 1:160 | 1:320 | 1:640 | 1:1280 |
| | Pullorum Test | − | − | − | + | + | + |

The results set forth above show clearly the substantial advantages of the polyethylene glycol-treated vaccine (III) obtained in accordance with the instant invention over the untreated vaccine (IV) in antibody production as to both amount and rapidity of appearance of antibody.

Example 7

A culture of the "Alaska" strain *Salmonella typhosa*, isolated from a human case of typhoid fever, was obtained from the Communicable Disease Center, Atlanta, Ga. The virulence of this strain was determined as follows: A dense bacterial suspension of the organisms to be tested was made by emulsifying bacterin from desoxycholate agar in 0.85 percent sodium chloride solution. A drop of 0.05 ml. of Salmonella Vi antiserum was mixed on a clean slide with 0.05 ml. of the bacterial suspension. The slide was placed on a warm 45° C. surface and the slide was rotated in a circular motion for 2 minutes. Rapid and complete agglutination was considered a positive test. A negative control test consisting of 0.05 ml. of 0.85 percent sodium chloride solution and 0.05 ml. of the bacterial suspension. The "Alaska" strain of *Salmonella typhosa* was agglutinated by the Vi antiserum, indicating virulence of the strain.

Proceeding in the manner described in Example 4 above, there was prepared a heat shocked, formalinized, polyethylene glycol-treated monovalent vaccine (designated Vaccine V) containing this "Alaska" strain of *Salmonella typhosa*.

A polyethylene glycol-free typhoid vaccine (designated Vaccine VI) was obtained by conventional means in order to compare the amount and rapidity of appearance of antibodies produced by Vaccines V and VI when each was injected subcutaneously into 3-week old White Leghorn chickens, mixed sexes. A 0.5 ml. dose of Vaccine V containing approximately $3 \times 10^9$ cells of polyethylene glycol-treated cells of *Salmonella typhosa* and a 0.5 ml. dose of Vaccine VI containing $1 \times 10^9$ cells were used. Each bird received one injection. The sera were collected and the antibody titers determined as in Example 6. The antigen used for testing the sera was a commercially available Salmonella Vi Antigen. The results thus obtained are shown below in Table III.

TABLE III

| Bird No. | Vac. | Antibody Titer Post-Inoculation in Days | | | | | | |
|---|---|---|---|---|---|---|---|---|
| | | 3 | 5 | 8 | 10 | 20 | 24 | 30 |
| 1 | V | 1:80 | 1:160 | 1:640 | 1:1280 | 1:2560 | 1:2560 | 1:2560 |
| 2 | V | 1:80 | 1:640 | 1:640 | 1:1280 | 1:2560 | 1:2560 | 1:1280 |
| 3 | V | 1:160 | 1:640 | 1:1280 | 1:1280 | 1:2560 | 1:2560 | 1:2560 |
| 4 | V | 1:40 | 1:80 | 1:160 | 1:320 | 1:640 | 1:1280 | 1:1280 |
| 5 | V | 1:40 | 1:160 | 1:640 | 1:1280 | 1:2560 | 1:2560 | 1:2560 |
| 6 | V | 1:80 | 1:160 | 1:640 | 1:1280 | 1:2560 | 1:2560 | 1:2560 |
| 7 | V |  | 1:80 | 1:160 | 1:480 | 1:640 | 1:640 | 1:960 |
| 8 | V | 1:40 | 1:80 | 1:640 | 1:960 | 1:2560 | 1:2560 | 1:5120 |
| 9 | V | 1:10 | 1:80 | 1:480 | 1:960 | 1:1280 | 1:1280 | 1:1280 |
| 10 | V | 1:20 | 1:40 | 1:320 | 1:480 | 1:1280 | 1:2560 | 1:1280 |
| 11 | VI | 1:10 | 1:40 | 1:320 | 1:640 | 1:960 | 1:960 | 1:1280 |
| 12 | VI |  | 1:20 | 1:320 | 1:480 | 1:1280 | 1:1280 | 1:1280 |
| 13 | VI |  | 1:40 | 1:160 | 1:480 | 1:1280 | 1:1280 | 1:1920 |
| 14 | VI | 1:20 | 1:160 | 1:480 | 1:640 | 1:1280 | 1:1920 | 1:1280 |
| 15 | VI | 1:10 | 1:20 | 1:480 | 1:480 | 1:960 | 1:1280 | 1:2560 |
| 16 | VI |  | 1:20 | 1:320 | 1:480 | 1:640 | 1:960 | 1:960 |
| 17 | VI |  | 1:40 | 1:160 | 1:320 | 1:640 | 1:960 | 1:1280 |
| 18 | VI |  | 1:40 | 1:160 | 1:160 | 1:640 | 1:640 | 1:640 |
| 19 | VI |  |  | 1:160 | 1:160 | 1:320 | 1:480 | 1:640 |
| 20 | VI |  | 1:80 | 1:160 | 1:320 | 1:320 | 1:640 | 1:640 |

The results set forth above show clearly the advantage of the polyethylene glycol-treated Vaccine (V) over the polyethylene glycol-free Vaccine (VI). The advantages are a rapid induction and a higher final titer of antibodies.

I claim:

1. The method of improving the antigenic properties of an aqueous killed vaccine of an organism of the group consisting of Pasteurella and Salmonella which comprises mixing the said vaccine with approximately 10 to 100 percent of its weight of a water-soluble liquid polyethylene glycol having an average molecular weight in the approximate range 200 to 600.

2. The method of improving the antigenic properties of an aqueous killed vaccine of Pasteurella which comprises mixing the said vaccine with approximately 10 to 100 percent of its weight of a water-soluble liquid polyethylene glycol having an average molecular weight of approximately 400.

3. The method of improving the antigenic properties of an aqueous killed vaccine of Pasteurella which comprises mixing the said vaccine, at a temperature in the approximate range 30–48° C., with approximately one-third of its weight of a water-soluble liquid polyethylene glycol having an average molecular weight of approximately 400.

4. The method of improving the antigenic properties of an aqueous killed fowl cholera vaccine of *Pasteurella multocida* which comprises mixing the said vaccine with approximately 10 to 100 percent of its weight of a water-soluble liquid polyethylene glycol having an average molecular weight of approximately 400.

5. The method of improving the antigenic properties of an aqueous killed fowl cholera vaccine of *Pasteurella multocida* which comprises mixing the said vaccine, at a temperature in the approximate range 30–48° C., with approximately one-third of its weight of a water-soluble liquid polyethylene glycol having an average molecular weight of approximately 400.

6. An aqueous killed fowl cholera vaccine preparation comprising: (a) an injectable aqueous killed fowl cholera vaccine of *Pasteurella multocida;* and (b), as an agent effective to improve the antigenic properties of the said vaccine, a water-soluble liquid polyethylene glycol having an average molecular weight in the approximate range 200 to 600 in the amount of approximately 5 to 50 percent by weight of the said preparation.

7. An aqueous killed fowl cholera vaccine preparation comprising: (a) an injectable aqueous killed fowl cholera vaccine of *Pasteurella multocida;* and (b), as an agent effective to improve the antigenic properties of the said vaccine, a water-soluble liquid polyethylene glycol having an average molecular weight of approximately 400 in the amount of approximately 5 to 50 percent by weight of the said preparation.

8. An aqueous killed fowl cholera vaccine preparation comprising: (a) an injectable aqueous killed fowl cholera vaccine of *Pasteurella multocida;* and (b), as an agent effective to improve the antigenic properties of the said vaccine, a water-soluble liquid polyethylene glycol having an average molecular weight of approximately 400 in the amount of approximately 6 to 8 percent by weight of the said preparation.

9. The method of improving the antigenic properties of an aqueous killed vaccine of Salmonella which comprises mixing the said vaccine with approximately 10 to 100 percent of its weight of a water-soluble liquid polyethylene glycol having an average molecular weight of approximately 400.

10. The method of improving the antigenic properties of an aqueous killed vaccine of Salmonella which comprises mixing the said vaccine, at a temperature in the approximate range 30–48° C., with approximately one-third of its weight of a water-soluble liquid polyethylene glycol having an average molecular weight of approximately 400.

11. The method of improving the antigenic properties of an aqueous killed vaccine of *Salmonella gallinarum* which comprises mixing the said vaccine, at a temperature in the approximate range 40–48° C., with approximately one-third of its weight of a water-soluble liquid polyethylene glycol having an average molecular weight of approximately 400.

12. An aqueous killed vaccine preparation comprising: (a) an injectable aqueous killed vaccine of Salmonella; and (b), as an agent effective to improve the antigenic properties of the said vaccine, a water-soluble liquid polyethylene glycol having an average molecular weight in the approximately range 200 to 600 in the amount of approximately 5 to 50 percent by weight of the said preparation.

13. An aqueous killed vaccine preparation comprising: (a) an injectable aqueous killed vaccine of *Pasteurella gallinarum;* and (b), as an agent effective to improve the antigenic properties of the said vaccine, a water-soluble liquid polyethylene glycol having an average molecular weight of approximately 400 in the amount of approximately 5 to 50 percent by weight of the said preparation.

14. The method of improving the antigenic properties of an aqueous killed vaccine of *Salmonella typhosa* which comprises mixing the said vaccine, at a temperature in the approximate range 30–48° C., with approximately one-third of its weight of a water-soluble liquid polyethylene glycol having an average molecular weight of approximately 400.

15. An aqueous killed vaccine preparation comprising: (a) an injectable aqueous killed vaccine of *Salmonella typhosa*; and (b), as an agent effective to improve the antigenic properties of the said vaccine, a water-soluble liquid having an average molecular weight in the approximate range 200 to 600 in the amount of approximately 5 to 50 percent by weight of the said preparation.

16. An aqueous killed vaccine preparation comprising: (a) an injectable aqueous killed vaccine of *Salmonella typhosa*; and (b), as an agent effective to improve the antigenic properties of the said vaccine, a water-soluble liquid polyethylene glycol having an average molecular weight of approximately 400 in the amount of approximately 6 to 8 percent by weight of the said preparation.

References Cited
UNITED STATES PATENTS

| | | | |
|---|---|---|---|
| 2,020,647 | 11/1935 | Hunwicke | 167—78 |
| 3,099,601 | 7/1963 | Davis et al. | 167—78 |

FOREIGN PATENTS

| | | |
|---|---|---|
| 681,024 | 9/1939 | Germany. |
| 784,659 | 10/1957 | Great Britain. |

OTHER REFERENCES

Carpenter et al., Journal of the American Pharmaceutical Association, Scientific Edition, volume 41, No. 1, pp. 27–29 (January 1952).

Merchant et al., Veterinary Bacteriology and Virology, 6th ed., published by Iowa State University Press, Ames, Iowa, 1961, pp. 361 and 421.

Schwartz et al., Surface Active Agents and Detergents, volume II, published by Interscience Publishers, Inc., New York, 1958, pp. 382–383.

Smith et al., Zinsser's Bacteriology, 11th Ed., published by Appleton-Century Crafts Inc., New York, 1957, pp. 466–469.

LEWIS GOTTS, *Primary Examiner.*

RICHARD HUFF, *Assistant Examiner.*

UNITED STATES PATENT OFFICE
CERTIFICATE OF CORRECTION

Patent No. 3,328,252                          June 27, 1967

Emilio C. Mora

It is hereby certified that error appears in the above numbered patent requiring correction and that the said Letters Patent should read as corrected below.

Column 2, line 64, strike out "by"; column 5, line 44, for "visible" read -- viable --; column 10, line 36, for "nitrogen" read -- antigen --; column 11, TABLE III, fourth column, line 2 thereof, for "1:640" read -- 1:160 --; column 12, line 66, for "40-48° C." read -- 30-48° C. --; line 75, for "approximately" read -- approximate --; column 13, line 20, for "liquid having" read -- liquid polyethylene glycol having --.

Signed and sealed this 30th day of July 1968.

(SEAL)
Attest:

Edward M. Fletcher, Jr.                        EDWARD J. BRENNER
Attesting Officer                              Commissioner of Patents